United States Patent
Zach et al.

(10) Patent No.: US 9,774,161 B2
(45) Date of Patent: Sep. 26, 2017

(54) FIBER DELIVERY OF SHORT LASER PULSES

(71) Applicant: Toptica Photonics AG, Graefelfing (DE)

(72) Inventors: Armin Zach, Windach (DE); Robert Herda, Munich (DE)

(73) Assignee: Toptica Photonics AG, Graefelfing (DE)

( * ) Notice: Subject to any disclaimer, the term of this patent is extended or adjusted under 35 U.S.C. 154(b) by 0 days.

(21) Appl. No.: 14/624,773

(22) Filed: Feb. 18, 2015

(65) Prior Publication Data
US 2016/0240997 A1 Aug. 18, 2016

(51) Int. Cl.
| | |
|---|---|
| *H01S 3/108* | (2006.01) |
| *H01S 3/10* | (2006.01) |
| *H01S 3/00* | (2006.01) |
| *H01S 3/067* | (2006.01) |

(52) U.S. Cl.
CPC ............ *H01S 3/108* (2013.01); *H01S 3/0057* (2013.01); *H01S 3/06725* (2013.01); *H01S 3/10061* (2013.01); *H01S 3/06712* (2013.01); *H01S 2301/085* (2013.01); *H01S 2302/02* (2013.01)

(58) Field of Classification Search
CPC ........ H01S 3/11; H01S 3/10007; H01S 3/067; H01S 3/108; H01S 3/06725; H01S 3/0057; H01S 3/10061; H01S 2301/085; H01S 3/06712; H01S 2302/02
See application file for complete search history.

(56) References Cited

U.S. PATENT DOCUMENTS

| | | | | |
|---|---|---|---|---|
| 5,862,287 A | * | 1/1999 | Stock | G02B 6/29394 359/332 |
| 2004/0263949 A1 | * | 12/2004 | Gu | H01S 3/0057 359/333 |
| 2006/0263024 A1 | * | 11/2006 | Dong | G02B 6/02 385/125 |
| 2012/0062984 A1 | * | 3/2012 | Tong | H01S 3/0057 359/337.2 |
| 2014/0061470 A1 | * | 3/2014 | Nakayama | H01S 5/0604 250/338.4 |

OTHER PUBLICATIONS

F. Eichhorn et al., "Optical fiber link for transmission of 1-nJ femtosecond laser pulses at 1550 nm," Optics Express, vol. 18, No. 7, pp. 6978-6987, 2010.

\* cited by examiner

*Primary Examiner* — Xinning Niu
(74) *Attorney, Agent, or Firm* — Collard & Roe, P.C.

(57) ABSTRACT

A method and system for delivering laser pulses achieves the delivery of high quality laser pulses at the location of an application. The method includes the steps of: generating laser pulses, amplifying the laser pulses, temporally stretching the amplified laser pulses, and propagating the amplified laser pulses through an optical delivery fiber of desired length, wherein the laser pulses are temporally compressed in the optical delivery fiber and wherein the laser pulses undergo nonlinear spectral broadening in the optical delivery fiber.

19 Claims, 1 Drawing Sheet

FIBER DELIVERY OF SHORT LASER PULSES

FIELD OF THE INVENTION

The invention relates to a method and to a system for delivering laser pulses.

BACKGROUND OF THE INVENTION

Fiber lasers providing short laser pulses (pulse duration shorter than 1 ps, also referred to as ultrashort pulses or femtosecond pulses) and high pulse energy (of typically more than 1 nJ), good beam quality and excellent optical characteristics have applications in many fields of scientific research and industry. There has been great progress in developing short pulse fiber lasers. However, difficulties remain associated with short laser pulses propagating in optical fibers over longer distances. Nonlinearities causing distortions in the spectrum as well as dispersion render the delivery of short laser pulses over distances of several meters (as often required in practical applications) complicated.

U.S. Pat. No. 5,862,287 describes an apparatus and method for delivery of dispersion compensated ultrashort optical pulses with high peak power. The known apparatus comprises a pulsed laser source which produces ultrashort optical pulses having a high peak power. Prior to transmitting the optical pulses through an optical delivery fiber, the temporal pulse width of the optical pulses is stretched, forming chirped optical pulses having a lower peak power. The pulse stretching may be performed within the laser or by a separate dispersive element (stretcher). The stretched optical pulses are transmitted through an optical fiber which delivers the pulses over a distance of several meters to an optical device where the laser pulses are used in a respective application. Because the peak power of the optical pulses is reduced by the stretching of the temporal pulse width nonlinear effects are reduced for the most part. The optical delivery fiber introduces a dispersion which compensates for the dispersion introduced by the pulsed laser source and the stretcher, such that a recompressed optical pulse is delivered to the application. Ideally, the optical delivery fiber also compensates for the dispersion introduced by optical components in the optical device used in the respective application, so that the laser pulses are fully recompressed at a point of interest, such as, for example, at a specimen or at a detector.

However, even with the known approach of stretching and recompressing the laser pulses the fiber delivery of laser pulses in the 1 nJ pulse energy-region with sub-100 fs pulse duration often results in a poor pulse quality. Typically, less than 50 percent of the total pulse energy is contained in the main peak of the laser pulse. Satellite pulses occur at the end of the delivery optical fiber wherein the energy contained in the satellite pulses is generally not usable. The satellite pulses might even saturate a nonlinear medium used in the respective application, as it might be the case for the generation of THz radiation.

In a typical known system (see F. Eichhorn et al., Opt. Express, vol. 18, no. 7, p. 6978, 2010), the laser pulses generated by a seed laser source are amplified and solitonically compressed in an anomalous dispersion fiber. Before temporal stretching in a dispersion compensating fiber (DCF) the laser pulses have their minimum pulse duration. Finally, the laser pulses are compressed in a standard optical fiber (SMF-28 or PM1550) used as delivery fiber. This method has major drawbacks. Due to the very short pulse duration third order dispersion becomes important. This can be compensated to a certain extent by choosing a carefully balanced third order dispersion of the DCF. Furthermore, the laser pulses obtain a strongly modulated spectral shape by solitonic compression. When stretching the laser pulse in the DCF they acquire a temporal shape that is similar to their spectral shape (analogous to Fraunhofer diffraction in the time-domain). During the following compression self-phase modulation (SPM) proportional to the temporal shape of the laser pulses causes a complex phase profile that prevents an efficient recompression. This results in a strongly structured pulse shape at the end of the delivery fiber with a significant part of the pulse energy being contained in the satellites.

SUMMARY OF THE INVENTION

From the foregoing it is readily appreciated that there is a need for an improved method and system for delivering short laser pulses. It is an object of the invention to achieve the delivery of high quality laser pulses at the location of an application.

In accordance with the invention, a method for delivering laser pulses is disclosed, which comprises the steps of:
  generating laser pulses,
  amplifying the laser pulses,
  temporally stretching the amplified laser pulses, and
  propagating the amplified laser pulses through an optical delivery fiber of desired length, wherein the laser pulses are temporally compressed in the optical delivery fiber and wherein the laser pulses undergo nonlinear spectral broadening in the optical delivery fiber.

It is the gist of the invention to generate the required spectral width of the laser pulses during propagation through the optical delivery fiber. In other words, the required spectral bandwidth of the laser pulses is generated according to the invention to a significant extent between the stretcher and the point of delivery at the end of the optical delivery fiber. In contrast to the above-mentioned prior art techniques, the laser pulses do not have their maximum spectral bandwidth before temporal stretching. According to the invention, the spectral bandwidth (root-mean-square width) of the laser pulses at the end of the optical delivery fiber is larger (preferably at least by a factor of 1.2) than their spectral bandwidth before temporal stretching.

The technique of the invention achieves an improved pulse shape of the laser pulses at the end of the optical delivery fiber. A significantly larger portion of the total pulse energy is contained in the main peak of the laser pulses.

A further advantage of the invention is that the propagation of smaller bandwidth pulses through the optical delivery fiber causes a reduced sensitivity to third order dispersion. This is of particular importance for longer delivery distances of, for example, 10 meters or more.

The approach of the invention is well-suited for achieving a pulse duration of high-power laser pulses at the end of the optical delivery fiber of less than 100 fs. Even a laser pulse duration of 70 fs or less may be achieved with good pulse quality.

The method of the invention is particularly well-suited for delivery of short (femtosecond) laser pulses having a pulse energy up to 20 nJ.

According to the invention, the pulse duration of the temporally stretched laser pulses should be at least 1 ps, preferably 2-10 ps for a fiber delivery length of 2-10 m. In this way, the peak power of the laser pulses is sufficiently reduced before propagation through the optical delivery fiber such that undesirable nonlinear effects can be avoided. For longer delivery lengths, the necessary stretch ratio has to be increased accordingly.

In preferred embodiments of the invention, the spectral bandwidth of the amplified and temporally stretched laser pulses is 10-50 nm, while the spectral bandwidth of the laser pulses after propagation through the optical delivery fiber is up to 120 nm. The comparably small bandwidth of the amplified laser pulses allows for a smooth spectral shape of the laser pulses prior to stretching. It can thus be avoided that the laser pulses acquire a strongly modulated temporal shape, like it is the case in the prior art approaches. During the following propagation through the optical delivery fiber spectral broadening can thus be achieved according to the invention without inducing a strongly structured pulse shape at the end of the delivery fiber.

Preferably, the laser pulses are amplified according to the invention without (significant) nonlinear spectral broadening in order to achieve a largely unstructured, smooth spectrum prior to stretching.

A parabolic amplification of the laser pulses may be applied. In this way, parabolic laser pulses having a temporal intensity profile with a parabolic shape and a correspondingly smooth spectral shape are generated. Such parabolic laser pulses may be generated in a known fashion, for example by propagating the laser pulses (having, for example, a Gaussian spectrum) of a seed laser through a suitable fiber amplifier where they experience optical gain, Kerr nonlinearity and normal chromatic dispersion.

In a further preferred embodiment, the optical delivery fiber may include a section of large mode area fiber. Corresponding to the dispersion of the large mode area fiber, the light pulses are temporally compressed within the large mode area fiber section, but essentially without any spectral broadening. Spectral broadening occurs mainly in the remaining portions of the optical delivery fiber (having a smaller mode area as compared to the large mode area fiber). The fraction of the optical delivery fiber formed by the large mode area fiber can be tuned so as to achieve the optimum measures of compression and spectral broadening for the specific application.

According to a further aspect of the invention, a method for delivering laser pulses is disclosed, which comprises the steps of:
generating laser pulses,
amplifying the laser pulses,
propagating the amplified laser pulses through a section of highly nonlinear optical fiber, wherein the laser pulses undergo nonlinear spectral broadening in the highly nonlinear optical fiber section,
temporally stretching the spectrally broadened laser pulses, and
propagating the amplified laser pulses through an optical delivery fiber of desired length, wherein the laser pulses are temporally compressed in the optical delivery fiber.

According to this aspect of the invention, a fiber delivery method is proposed, in which the spectral bandwidth of the delivered laser pulses is increased in a controlled manner by adding a highly nonlinear optical fiber between the amplification and stretching stages. The bandwidth (root-mean-square width) of the optical spectrum of the laser pulses is increased preferably by a factor of more than 1.2 in the highly nonlinear fiber.

In the case of a comparably low pulse energy (up to 2 nJ), for example in cases in which the laser pulses are split up into multiple propagation paths after the temporal stretching and before the end of the optical delivery fiber, it may not be suitable to generate the required spectral bandwidth in the optical delivery fiber as described herein above by nonlinear spectral broadening. Instead, the amplified laser pulses (generated for example by a parabolic amplifier) are temporally stretched (for example in a dispersion compensating fiber). To control the spectral bandwidth the lengths of an optional pre-compression fiber section (having anomalous dispersion) and the highly nonlinear fiber (having normal dispersion) can be tuned to obtain the desired spectral bandwidth.

The invention not only relates to a method but also to a system for delivering laser pulses, comprising:
a laser source generating laser pulses;
an optical amplifier amplifying the laser pulses;
an optical stretcher temporally stretching the amplified laser pulses; and
an optical delivery fiber of desired length, through which the stretched laser pulses are propagated, wherein the laser pulses are temporally compressed in the optical delivery fiber and wherein the laser pulses undergo nonlinear spectral broadening in the optical delivery fiber.

The optical stretcher preferably comprises a section of dispersion compensating optical fiber, while the optical delivery fiber comprises a section of single mode optical fiber having anomalous dispersion (like, for example, a conventional SMF-28 or PM1550 telecommunication fiber).

The length of the optical delivery fiber may be least 2 meters, preferably at least 5 meters, most preferably at least 10 meters.

According to a further aspect, the invention relates to a system for delivering laser pulses, comprising:
a laser source generating laser pulses;
an optical amplifier amplifying the laser pulses;
a section of highly nonlinear optical fiber, through which the amplified laser pulses are propagated, wherein the laser pulses undergo spectral broadening in the highly nonlinear optical fiber section;
an optical stretcher temporally stretching the amplified and spectrally broadened laser pulses; and
an optical delivery fiber of desired length, through which the stretched laser pulses are propagated, wherein the laser pulses are temporally compressed in the optical delivery fiber.

In a preferred embodiment of the invention, the optical amplification as well as the temporal stretching of the laser pulses may both be provided by a single optical fiber. The optical amplifier and the optical stretcher may thus be physically the same optical fiber.

In order to obtain the desired properties of the laser pulses at the point of delivery, the optical delivery fiber may be composed accordingly of sections of different types of optical fibers. For example, the optical delivery fiber may comprise sections of increasing nonlinearity or decreasing dispersion in propagation direction in order to achieve a short pulse duration at the output of the delivery fiber of less than 50 fs.

For polarization-sensitive applications, the optical stretcher as well as the optical delivery fiber may be polarization maintaining.

The pulse delivery concept of the invention is well-suited for applications involving nonlinear frequency-conversion. Hence, in a preferred embodiment of the system of the invention, the optical delivery fiber may be terminated by a nonlinear frequency-converting element, such like, for example, a non-linear crystal for doubling the frequency of the laser pulses. In another preferred embodiment, the optical delivery fiber may be terminated by a Terahertz-radiation generating antenna for generating electromagnetic radiation in the Terahertz range from the laser pulses delivered via the optical delivery fiber.

BRIEF DESCRIPTION OF THE DRAWINGS

The enclosed drawings disclose preferred embodiments of the present invention. It should be understood, however, that the drawings are designed for the purpose of illustration only and not as a definition of the limits of the invention. In the drawings.

DETAILED DESCRIPTION OF THE EMBODIMENTS

Figure 1:
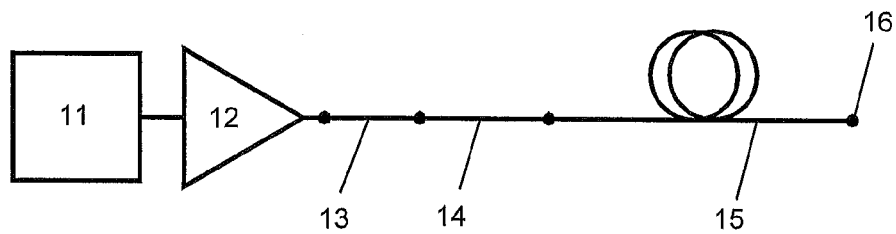
FIG. 1 schematically shows a laser system according to the invention.

FIG. 1 schematically shows a laser system according to the invention. The system comprises a laser seed source 11 generating short laser pulses at 1550 nm. The laser source 11 may be, for example, a mode locked fiber laser of well-known, commercially available type. The output laser pulses of the laser source 11 are fed into an optical amplifier 12 which is a parabolic amplifier in the depicted embodiment. The optical amplifier 12 provides at its output chirped laser pulses having a smooth and essentially parabolic optical spectrum. These laser pulses are temporally stretched in a dispersion compensating fiber section 13 in which the laser pulses acquire a temporal shape that is similar to their spectral shape.

Figure 3:
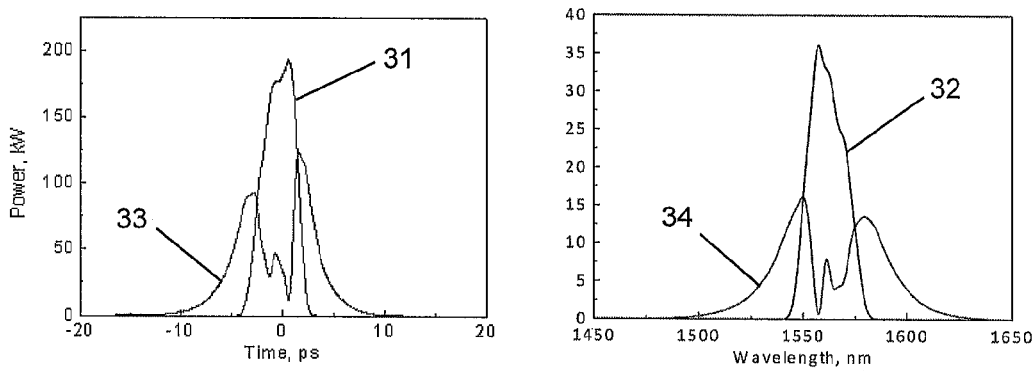
FIG. 3 shows the temporal pulse shape and the spectrum of light pulses after stretching according to the invention.

The left diagram of FIG. 3 shows the temporal shape 31 of the laser pulses after stretching according to the invention. The duration of the stretched laser pulses is about 5 ps. The right diagram shows the corresponding smooth optical spectrum 32.

The strongly modulated broad spectrum of laser pulses that conventionally experience solitonic compression during amplification translates into a correspondingly modulated temporal pulse shape 33 after stretching. The corresponding optical spectrum is designated by reference number 34 in the right diagram of FIG. 3.

The system of the invention further comprises an optical delivery fiber which is formed in the depicted embodiment by a section of large mode area fiber 14 and a section of standard PM1550 telecommunication fiber 15. Both the large mode area fiber 14 and the PM1550 fiber 15 have anomalous dispersion. The mode field diameter of the large mode area fiber 14 is about 20 μm. The stretched laser pulses are compressed in the large mode are 14 and further compressed in the PM1550 fiber 15. Moreover, the laser pulses experience spectral broadening in the PM1550 fiber 15 according to the invention. The lengths of the dispersion compensating fiber 13, the large mode area fiber 14, and the PM1550 fiber 15 are tuned to obtain an optimum pulse shape at the end point 16 of the optical delivery fiber. The length of the optical delivery fiber may be 10 meters or more. The pulse duration of the laser pulses at the end point 16 may be 100 fs or less.

Figure 4:
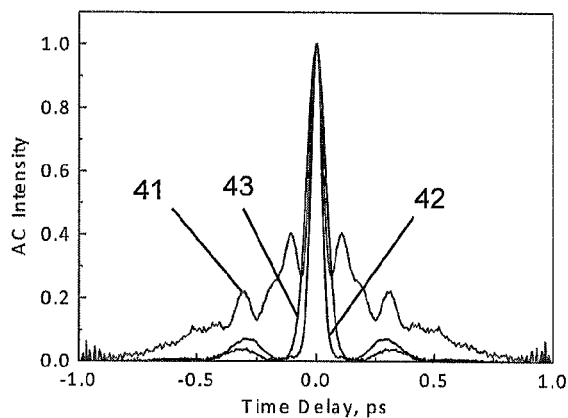
FIG. 4 shows temporal pulse shapes of light pulses delivered conventionally and according to the invention in comparison.

The compression and self-phase modulation in the optical delivery fiber is proportional to the temporal shape of the laser pulses. With the conventionally strongly modulated laser pulses (see reference numbers 33 and 34 in FIG. 3) a complex phase profile is caused that prevents an efficient recompression. This results in a strongly structured pulse shape at the end of the optical delivery fiber with a significant part of the pulse energy being contained in satellite pulses. This is illustrated in the diagram of FIG. 4. The temporal pulse shape of conventionally amplified, stretched, and delivered laser pulses at the end point of the optical delivery fiber is designated by reference number 41. The conventional configuration provides a pulse duration of about 70 fs wherein only about 40% of the pulse energy is contained in the main peak.

The temporal shape of the laser pulses at the end point 16 of the optical delivery fiber according to the invention is designated by reference numbers 42 and 43 in FIG. 4. The setup of the invention delivers a pulse duration of about 65 fs with almost 90% of the pulse energy being contained in the main peak. The pulse shape 43 corresponds to a setup with a section of large mode area fiber 14 and PM1550 fiber being included in the delivery optical fiber. It is possible to achieve even shorter pulse durations when adding a second nonlinear compression stage with higher nonlinearity and/or lower anomalous dispersion after the PM1550 fiber (not shown). A pulse durations of 38 fs has been achieved when adding a fiber with ~8 μm core diameter after the PM1550 fiber before point 16.

Figure 2:
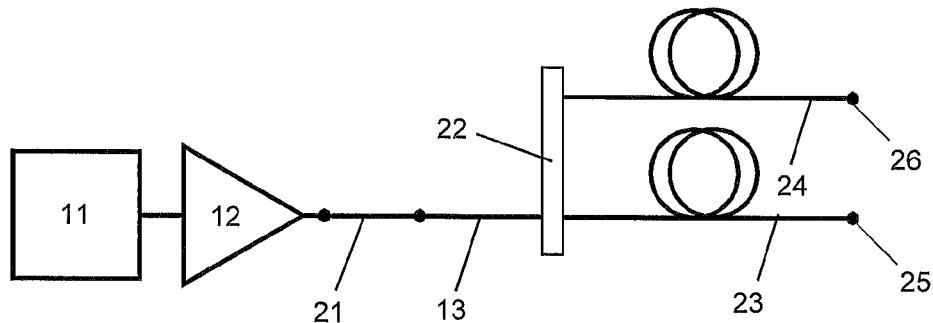
FIG. 2 schematically shows a further embodiment of the laser system according to the invention.

The embodiment of the system of the invention illustrated in FIG. 2 is designed for delivery of laser pulses in a low power regime. The spectral bandwidth of the delivered laser pulses is increased in a controlled manner by introducing a highly nonlinear fiber section 21 between optical amplifier 12 and the dispersion compensating fiber 13. The root-mean-square width of the optical spectrum increases by a factor of more than 1.2 in the nonlinear fiber section 21.

The laser pulses are split by a power splitter 22 into two paths of optical delivery fibers 23, 24 after the dispersion compensating fiber. The energy of the laser pulses is thus reduced such that it is not suitable to generate the spectral bandwidth of the laser pulses at the end of the optical delivery fiber as in the embodiment of FIG. 1.

The chirped laser pulses generated by parabolic amplifier 21 are fed into the dispersion compensating fiber 13 for stretching, wherein the spectral bandwidth is controlled by adjusting the lengths of an optional pre-compression fiber (anomalous dispersion, not shown) and the highly nonlinear fiber 21 (normal dispersion) to achieve the desired spectral bandwidth of the laser pulses at the end points 25, 26 of the optical delivery fibers 23, 24.

What is claimed is:

1. Method for delivering laser pulses, comprising the steps of:
   generating laser pulses,
   amplifying the laser pulses,
   temporally stretching the amplified laser pulses, and
   propagating the amplified laser pulses through an optical delivery fiber having a length of at least 2 meters,
   wherein the laser pulses are temporally compressed in the optical delivery fiber,
   wherein the laser pulses undergo nonlinear spectral broadening in the optical delivery fiber so that the spectrum of the laser pulses is broadened by at least a factor of 1.2 in the optical delivery fiber,
   wherein the laser pulses have a first spectral bandwidth before the temporal stretching, wherein the laser pulses have a second spectral bandwidth at an end of the optical delivery fiber, wherein the second spectral bandwidth is larger than the first spectral bandwidth, and wherein the spectral bandwidth of the amplified and temporally stretched laser pulses is 10-50 nm, while the spectral bandwidth of the laser pulses after propagation through the optical delivery fiber is up to 120 nm.

2. Method of claim 1, wherein the pulse duration of the laser pulses at the end of the optical delivery fiber is less than 100 fs.

3. Method of claim 1, wherein the pulse duration of the temporally stretched laser pulses is at least 1 ps.

4. Method of claim 1, wherein the laser pulses are amplified without nonlinear spectral broadening.

5. Method of claim 1, wherein the amplified laser pulses have a parabolic spectrum.

6. Method of claim 1, wherein the energy of the amplified laser pulses is up to 20 nJ.

7. System for delivering laser pulses, comprising:
a laser source generating laser pulses;
an optical amplifier amplifying the laser pulses;
an optical stretcher temporally stretching the amplified laser pulses; and
an optical delivery fiber having a length of at least 2 meters, through which the stretched laser pulses are propagated,
wherein the laser pulses are temporally compressed in the optical delivery fiber,
wherein the laser pulses undergo nonlinear spectral broadening in the optical delivery fiber so that the spectrum of the laser pulses is broadened by at least a factor of 1.2 in the optical delivery fiber, and
wherein the laser pulses have a first spectral bandwidth before the temporal stretching,
wherein the laser pulses have a second spectral bandwidth at an end of the optical delivery fiber,
wherein the second spectral bandwidth is larger than the first spectral bandwidth, and
wherein the spectral bandwidth of the amplified and temporally stretched laser pulses is 10-50 nm, while the spectral bandwidth of the laser pulses after propagation through the optical delivery fiber is up to 120 nm.

8. System of claim 7, wherein the optical amplifier is a parabolic amplifier.

9. System of claim 7, wherein the optical stretcher comprises a section of dispersion compensating optical fiber.

10. System of claim 7, wherein the optical delivery fiber comprises a section of single mode optical fiber having anomalous dispersion.

11. System of claim 7, wherein the optical delivery fiber comprises a section of large mode area fiber.

12. System of claim 7, wherein the length of the optical delivery fiber is at least 5 meters, most preferably at least 10 meters.

13. System of claim 7, wherein the wavelength of the laser pulses is between 1500 nm and 1600 nm.

14. System of claim 7, wherein the optical amplifier and the optical stretcher are physically the same optical fiber.

15. System of claim 7, wherein the optical delivery fiber comprises sections of different types of optical fibers.

16. System of claim 15, wherein the optical delivery fiber comprises sections of increasing nonlinearity or decreasing dispersion in propagation direction.

17. System of claim 7, wherein the optical stretcher and the optical delivery fiber are polarization maintaining.

18. System of claim 7, wherein the optical delivery fiber is terminated by a nonlinear frequency-converting element.

19. System of claim 18, wherein the nonlinear frequency-converting element is a Terahertz-radiation generating antenna.

* * * * *